Oct. 13, 1964  G. L. WIEBER  3,152,507
FASTENER HAVING A GROOVED AND SLOTTED HEAD
Filed July 5, 1961
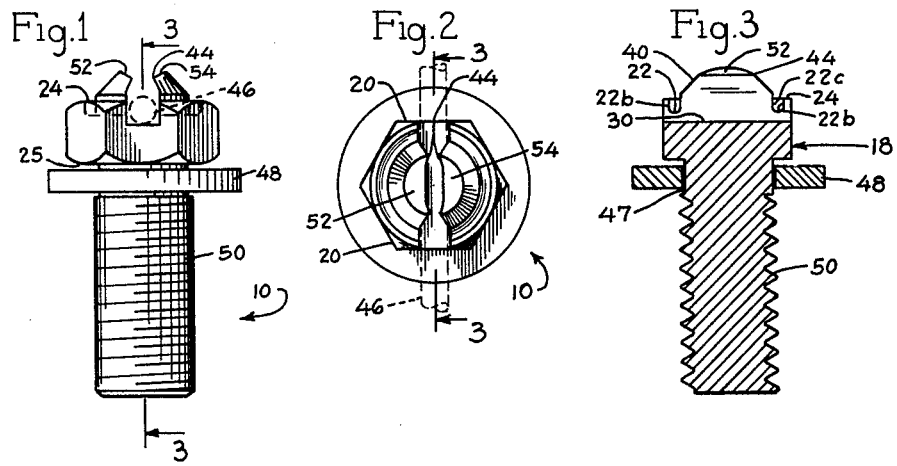
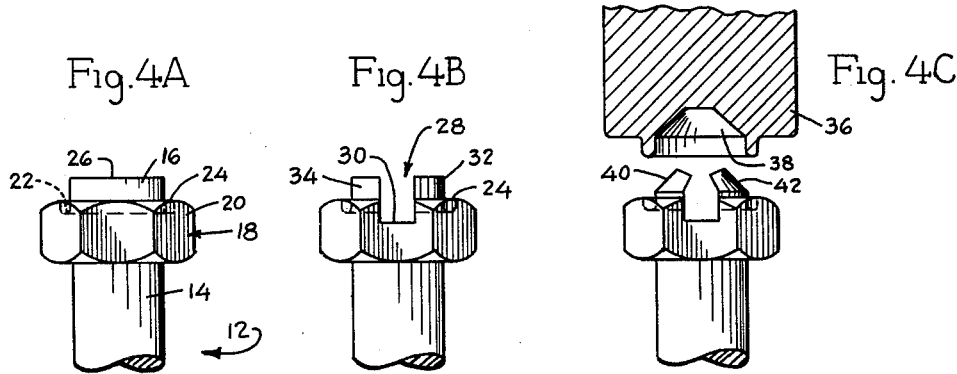
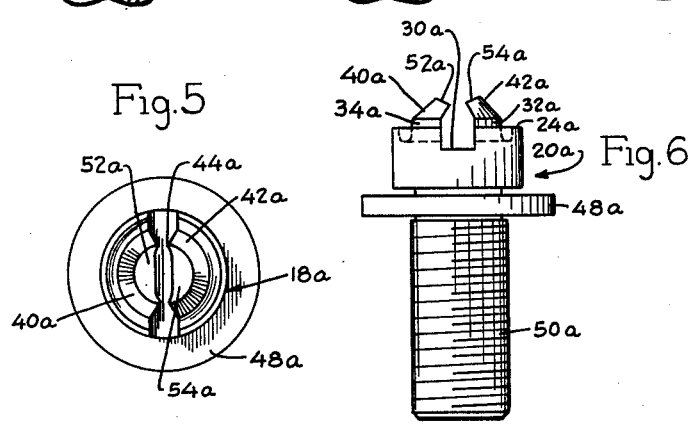
INVENTOR.
George L. Wieber
BY
ATT'Y.

United States Patent Office 3,152,507
Patented Oct. 13, 1964

---

3,152,507
FASTENER HAVING A GROOVED AND SLOTTED HEAD
George L. Wieber, Mount Prospect, Ill., assignor to Illinois Tool Works Inc., a corporation of Delaware
Filed July 5, 1961, Ser. No. 121,943
7 Claims. (Cl. 85—9)

This invention relates in general to fasteners and more particularly relates to a threaded fastener having a head portion with an axially visible and tactilely identifiable locking slot and to the method of making same.

There are many applications requiring a threaded fastener having a locking slot for receipt of a wire locking member in the head portion of the fastener. For example, in mounting a transportation frame to a heavy appliance, it is quite conventional to have a bolt which is threaded through the frame member and directly into a helical impression in a support member of the appliance. The bolts used heretofore were formed with a drill hole traversing the head of the bolt for insertion of a locking wire which is used to prevent rotation of the bolt due to vibration during the shipping of the appliance.

Bolts of the above nature have suffered various disabilities, namely, the drilling of a hole is an expensive operation, consequently increasing the cost of the bolt substantially; the cross drilled holes are difficult to find visually by a workman for insertion of the locking wire; and it is difficult to have a tactile reference point on the bolt head for inserting the wire in difficult to reach applications where the locking wire is being inserted in a "blind" manner.

It is the general object of this invention to provide a method for forming a locking slot in the head of a bolt member which is inexpensive, easily accomplished on existing machinery, and which provides an economical fastener which is well adapted for the purposes for which it is designed.

It is a further object of this invention to provide a fastener having a locking slot traversing the head portion thereof, which may be factory preclosed, or may be subject to field closing if desired.

It is a further object of this invention to provide a fastener and method of manufacturing same having a pair of axially projecting bosses which are deformed to at least partially close off the locking slot so as to provide a locking slot without derating the strength of the head of the bolt.

It is a further object of this invention to provide a method of closing pair of opposed semi-circular projections on the head of a fastener so as to at least partially close off a locking slot in a manner which does not require orientation of the closing tool and the fastener.

It is a further object of this invention to provide a locking slot in a rotatable fastener member which may be closed after rotatably assembling the fastener member to a suitable assembly with a conventional screw driver, the closure being accomplished with a conventional hammer or the like without derating the strength of the head and no special equipment being needed.

A further more specific object of the invention is to provide a hex head type bolt having wrenching surfaces which are not affected by the moving of projecting bosses in a manner which at least partially closes off a transverse locking slot.

The novel features that are characteristic of this invention are set forth with particularity in the appended claims. The invention itself, however, both as to its organization and its method of operation together with additional objects and advantages thereof will best be understood by the following description of specific embodiments when read in connection with the accompanying drawings in which:

FIG. 1 is a front elevational view of a finished fastener;

FIG. 2 is a top plan view of the fastener shown in FIG. 1;

FIG. 3 is a sectional view along lines 3—3 of FIG. 2;

FIGS. 4A through 4C are sequential steps in the forming operation of the fasteners shown in FIGS. 1 through 3;

FIG. 5 is a top plan view similar to FIG. 2, of an alternate form of fastener; and FIG. 6 is a front elevational view, similar to FIG. 1, of the fastener shown in FIG 5.

The fastener 10 shown in FIG. 1 is initially formed from elongated rod stock which is made into a preformed blank 12 shown in FIG. 4A. The blank 12 has a shank portion 14 having a predetermined initial diameter and the head portion 18 is formed intermediate the two ends of the blank 12 so as to leave a short axial extension 16 of the original rod stock. It will be noted that the portion 16 which extends above the radially enlarged head portion 18 projects thereabove a substantial distance, however, the amount of projection is less than the axial height of the head portion 18. The head portion 18 is formed with a hex shape with wrenching flats 20 around the periphery thereof. To completely fill out the corners of the wrenching flat, a circular shallow groove 22 is formed in the top of the head portion 18. Shallow groove 22 has an inner-diameter 22c, which is the same diameter as rod portions 14 and 16, and an outer-diameter 22b, which is spaced inboard from the outer periphery of the head 18. The groove 22 is recessed from the top 24 of the head 18 and depending upon the criticality of the wrenching flats, may in certain applications be dispensed with.

The top surface 26 of the projecting portion 16 is bisected by a locking groove 28, which is generally rectilinear in shape. The locking groove 28 has a base 30, which is spaced from top surface 26 a substantial distance and which intersects and is normal to a pair of opposed wrenching flats 20. The groove 28 also intersects the axis of the fastener 10 to define, along with groove 22 a pair of symmetrical, opposed, substantially semi-circular projecting bosses 32 and 34.

The groove 28 may be formed by a conventional sawing operation similar to putting a kerf in a bolt head. After formation of the bosses 32 and 34, the bolt blank 12 may be disposed in a suitable holder and a die member 36 having a conical recess 38 impinges upon the bosses 32 and 34 to move them relatively towards each other and upsets them slightly to the shape shown in FIG. 4C. It will be noted that there is no orientation required of the blank 12 relative to the die member 36.

The projections 32 and 34 after being upset by the die member 36 assume a form, in plan view, substantially similar to one-half of an offset truncated cone, the conical portions being denominated 40 and 42 respectively. Due to the upsetting operation, four opposed nibs 44 are formed in the corners of the projections, said nibs together with the offsetting of the individual projections 32 and 34 towards each other serving to retain a wire locking member 46 shown diagrammatically in FIGS. 1 and 2. The top surface 26 of each of the projecting portions 32 and 34 after engagement of the projecting portions 32 and 34 with the die member 36 become canted inwardly at a slight angle as shown at 52 and 54. These slight canted surfaces 52–54 together with the edges of the slot 28 where they intersect the side edges of portions 40–42 provide a ready tactile reference to a workman who is trying to insert a wire 46 into the slot of a fastener member when he cannot see same. Also, the formation and location of the nibs 44 and the conical surfaces 40 and 42 serve to reduce sharp areas to prevent damage to a workman during assembly operations.

After formation of the head portion as shown, a washer 48 is often inserted underneath the head 18 of the blank and threads 50 are then rolled on to the lower portion of the shank. The outer diameter of the threads is preferably larger than the diameter of the aperture in the washer so that the washer 48 is captivated and freely rotatable on a shoulder 47 left in the thread rolling operation. The shoulder 47 is the same diameter as the initial diameter of the rod stock and the same diameter as portion 16 and the inner-diameter 22c of the groove 22.

Care should be taken that the depth of the base 30 of locking slot 28 does not extend to the full axial height of the wrenching flat 20. Thus the structural strength of the head 20 of the fastener is maintained. This prevents any tendency to crack the head 18 upon tightening of the fastener to its desired torque and does not derate the fastener.

The embodiment shown in FIGS. 5 through 6 is substantially similar to that discussed hereinbefore and similar parts will be identified with similar reference numerals with the addition of the suffix "a." The essential difference in the fasteners shown in FIGS. 5 and 6 is that the head 18a is essentially a round head rather than a hex head. In some applications it is desired that a fastener member such as shown in FIGS. 5 and 6 be tightened with a screw driver prior to the placing of the locking wire therein. To this end the projections 32 and 34 are left in the positions shown in FIG. 4B. The fastener 18a is then fastened in place with a conventional screw driver, the locking member inserted therein, and then a suitable implement such as a hammer may be used to close the nibs and retain the locking member in the slot 28a. This relationship makes it difficult for unauthorized removal of the locking member.

Although specific embodiments of the invention have been shown and described, it is with full awareness that many modifications thereof are possible. The invention, therefore, is not to be restricted except insofar as is necessitated by the prior art and by the spirit of the appended claims.

What is claimed as the invention is:

1. A fastener comprising an elongated threaded shank of predetermined initial diameter having an entering end and an integral head portion, said head portion being characterized as extending radially a greater distance than the threaded shank and being formed with wrench engageable peripheral flats perpendicular with the axis of said fastener, the side of the head portion opposite said threaded portion having a recessed circular groove of predetermined depth to provide inner and outer diameters, the inner diameter of said groove being substantially equal to the initial diameter of said shank, the outer diameter being radially inboard of said wrench engaging flats, a pair of initially substantially semicircular upstanding integral projections defined by said recessed groove and by a slot transverse to the axis, said slot intersecting the axis of said fastener and being normal to and intersecting two oppositely disposed wrench engaging flats, said slot having a depth greater than the depth of said groove, said upstanding projections initially projecting a substantial axial distance above the furthest axial extent of said wrench engaging flats, said projections being adapted to be engaged and moved toward each other to at least partially overlie said slot whereby a fastener with an axially visible locking hole for receipt of a locking member is provided.

2. A fastener comprising an elongated threaded shank having an entering end and an integral head portion, said head portion being characterized as extending radially a greater distance than the threaded shank, the side of the head portion opposite said threaded portion having a recessed circular groove concentric with the axis of the fastener and of predetermined depth, the inner diameter of said groove being substantially equal to the initial diameter of said shank, and a pair of substantially semicircular upstanding integral projections defined by said recessed groove and a slot substantially transverse to the axis, said slot intersecting the axis of said fastener and having a depth greater than the depth of said groove, said upstanding projections initially projecting a substantial axial distance above the head portion and being adapted to be engaged and moved toward each other to at least partially overlie said slot whereby a fastener with an axially visible locking hole for receipt of a locking member is provided.

3. The fastener set forth in claim 2 wherein a shank portion of the same diameter as said inner diameter of said groove is provided on the side of said head opposite from said projections to rotatably receive an apertured washer having an aperture outer diameter less than the greatest diameter of the threads therebelow on said shank and more than the diameter of said shank portion.

4. The fastener set forth in claim 2 wherein the projections after movement to at least partially overlying position to the slot are each in the form of an angularly disposed half of a truncated cone.

5. The fastener set forth in claim 2 where the head portion is essentially circular in radial extent.

6. A fastener comprising an elongated threaded shank of predetermined initial diameter having an entering end and an integral head portion, said head portion being characterized as extending radially a greater distance than the threaded shank and being formed with wrench engageable peripheral flats perpendicular with the axis of said fastener, the side of the head portion opposite said threaded portion having a recessed circular groove of predetermined depth, the inner diameter of said groove being substantially equal to the initial diameter of said threaded shank, a pair of substantially semicircular upstanding integral projections defined by said recessed groove and a rectilinear slot transverse to the axis, said slot intersecting the axis of said fastener and being normal to and intersecting two oppositely disposed wrench engaging flats, said slot having a depth greater than the depth of said groove, said upstanding projections initially projecting a substantial axial distance above the furthest axial extent of said wrench engaging flats, said projections being adapted to be engaged and moved toward each other to at least partially overlie said slot whereby a fastener with an axially visible locking hole for receipt of a locking member is provided.

7. A fastener comprising an elongated threaded shank having an entering end and an integral head portion, said head portion being characterized as extending radially a greater distance than the threaded shank, the side of the head portion opposite said threaded portion having a recessed circular groove concentric with the axis of the fastener and of predetermined depth, the inner diameter of said groove being substantially equal to the initial diameter of said shank, and a pair of substantially semicircular upstanding integral projections defined by said recessed groove and a slot substantially transverse to the axis, said slot intersecting the axis of said fastener and having a depth greater than the depth of said groove, said upstanding projections projecting a substantial axial distance above the head portion and being canted toward each other to at least partially but not totally overlie said slot whereby a fastener with an axially visible locking hole for receipt of a locking member is provided.

References Cited in the file of this patent

UNITED STATES PATENTS

| | | | |
|---|---|---|---|
| Re. 22,681 | Bugg | _____ | Oct. 16, 1945 |
| 2,084,078 | Clark | _____ | June 15, 1937 |
| 2,182,092 | O'Leary | _____ | Dec. 5, 1939 |
| 2,355,900 | Beede | _____ | Aug. 15, 1944 |
| 2,890,734 | Mullin | _____ | June 16, 1959 |
| 3,011,234 | Fiddler | _____ | Dec. 5, 1961 |

FOREIGN PATENTS

| | | | |
|---|---|---|---|
| 1,255,116 | France | _____ | Jan. 23, 1961 |

OTHER REFERENCES

American Machinist, page 181, volume 45, No. 5, published Aug. 3, 1916, copy in 151–33.